INVENTOR.
GERALD N. FRANKS
CHARLES S. SHAW

July 2, 1963 G. N. FRANKS ET AL 3,096,276
APPARATUS AND METHOD OF CLEANING SEED COTTON
Filed Feb. 9, 1961 4 Sheets-Sheet 4

INVENTOR.
GERALD N. FRANKS
BY CHARLES S. SHAW

United States Patent Office 3,096,276
Patented July 2, 1963

3,096,276
APPARATUS AND METHOD OF CLEANING SEED COTTON
Gerald N. Franks, 1708 N. Robertshaw, Greenville, Miss., and Charles S. Shaw, 402 S. Deer Creek Drive W., Leland, Miss.
Filed Feb. 9, 1961, Ser. No. 88,235
3 Claims. (Cl. 209—20)
(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

The patent rights for the United States in any invention in the patent to be granted on this application are dedicated to the public.

This invention relates to a cleaner for seed cotton, hereinafter also referred to as cotton, and has as one of its objects the provisions of a cleaner which will remove green bolls, rocks, tramp metal, hulls, leaves, sticks and stems, grass and other lgihtweight trashes from cotton, by utilizing the combined effects of centrifugal force, scrubbing action and gravity to separate foreign material, hereinafter referred to as trash, from the cotton in a simple and efficient manner. Another object is to provide a cleaner so designed as to prevent any return of the trash to the cotton after separation.

A further object of our invention is to provide apparatus and method for effectively removing trash, such as green bolls, rocks, tramp metal, and other less heavy trashes from cotton having no mechanically moving parts, such as saws and doffing cylinders.

In general, these and other objects are achieved by providing a relatively deep rectangular shaped duct within a casing, with said duct making a 90 degree turn from a horizontal to an upwardly direction, and an inclined, adjustable partition forming part of said duct in such a manner as to aid in diverting the flow of cotton upward and, at the same time, forming an adjustable discharge opening. The lower edge of said partition thus forms one side of an elongated trash discharge opening which can be completely closed to effect an efficient by-pass of that portion of cleaning operation. In conjunction with proper air velocity, the inclined partition and trash discharge opening provide a zone for the first cleaning operation.

There is also provided a casing having a relatively wide, shallow duct attached to the relatively deep rectangular shaped duct. The said wide, shallow duct has two reverse turns, and in the heel or outermost wall of each turn, we provide a plurality of relatively close spaced slots or trash discharge openings to act as a scrub board for removing lightweight trashes. Without the introduction of additional air, the cleaning action is enhanced by increasing the velocity of the trash-laden cotton from the original 1500 feet per minute in the relatively deep, rectangular duct for the initial cleaning operation, to approximately 4500 feet per minute for the succeeding cleaning operations. This is accomplished by reducing the area of the wide, shallow duct to substantially two-thirds of that of the relatively deep, rectangular duct. This increased velocity intensifies the scrubbing action of the cotton across the trash discharge openings, thus increasing the trash removal without harmful effects to the cotton.

The invention will now be described in detail below, with reference being made to the accompanying drawings in which.

Figure 1:
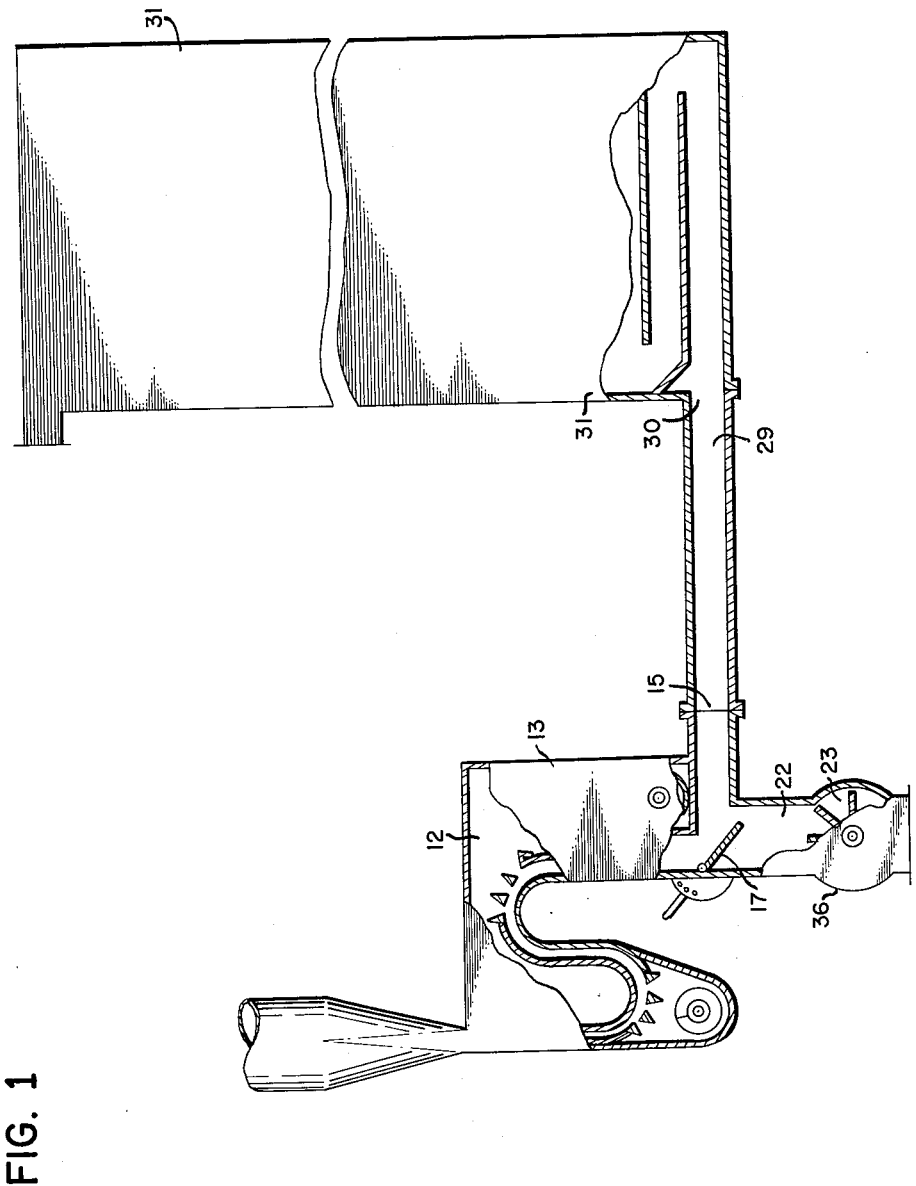
FIGURE 1 is a side elevational view partly in section, of a complete assembly including a seed cotton drier connected to our seed cotton cleaner by a rectangular duct.

The casing of the cleaner having a front wall 10, back wall 11, side walls 12 and 13, and top wall 14, is provided with an inlet 15 in the front wall, approximately half-way between the top and the bottom of the casing, through which harvested seed cotton containing green bolls, rocks, tramp metal and lighter weight trashes, which it is desired to remove, is introduced into the relatively deep, rectangular duct 16 within the casing.

An adjustable inclined partition 17 is secured along its upper edge to shaft 38 and pivotally mounted by shaft 38 extending through walls 12 and 13 and adjacent to wall 36, said extended shaft being provided with a handle 41 outside of wall 12 for making adjustment of the inclined partition. A locking screw 42 secures handle and partition in place after making the trash opening adjustment. The inclined partition is positioned in the casing to form part of duct 16 in a manner to aid in diverting the flow of seed cotton within said duct to an upwardly direction and at the same time furnish means to regulate the width of the trash discharge slot or opening 19, formed by the lower edge of said partition and the junction of lower wall 20 of duct 16 and wall 21. This upward movement of the cotton carried by an air stream at a velocity sufficient only to lift seed cotton, allows the heavy green bolls, rocks, and tramp metal to drop out of the streams of cotton and pass through said trash discharge opening 19 into an air-tight chamber 22 from where it is discharged by any conventional method, such as by a vacuum feeder 23 at the bottom of the cleaner. The construction is such that the air-tight chamber 22 is positioned within the casing and directly below the inclined partition 17 and between walls 21 and 36.

Immediately above the pivoted edge of the inclined partition and within the casing, the horizontal, rectangular duct 16 changes to a vertical direction for approximately 6 inches, when it is then reduced approximately two-thirds in thickness, thereby forming a relatively wide, shallow duct 32 having two substantially reverse and opposed turns forming an S curve. The heel or outermost wall of each turn is provided with rotatable triangular bars 33 and 45 to form trash discharge openings 24 and 25 traversing the width of the duct, across which the cotton is scrubbed to remove lightweight trashes. Adjacent to the trash discharge openings 24 is an air-tight chamber 35 for receiving trash expelled through these openings. A similar air-tight chamber 37 is provided adjacent to openings 25. Provided in each air-tight chamber is means for removing the trash, such as screw conveyors 26 and 27 or other suitable means.

The cleaned cotton is then discharged through outlet 28 located in top wall 14 of the casing, and is then pneumatically conveyed to other processing equipment in the ginning system (not shown).

As shown in FIGURE 1, the inlet 15, which is substantially the same width as the outlet end of a conventional seed cotton drier, is connected by a rectangular duct 29, to the outlet 30 of such a cotton drier 31 to receive relatively dry cotton from the drier at a relatively low velocity of 1500 feet per minute and in a relatively thin layer. Since the introduction of dry cotton into our cleaner in a thin layer produces maximum cleaning results, it is desirable to have the cleaner installed following a continuous process drier, such as the well-known tower drier, that discharges its cotton in a dry, fluffy relatively thin layer.

The floating velocity of heavier trashes, such as green bolls and the rocks and tramp metal usually found in seed cotton is from 3500 to 4500 feet per minute, while the floating velocity of dry seed cotton is approximately 1300 feet per minute. It is obvious, therefore, that to float only the cotton and lighter weight trashes, and not the heavier trashes, we should for the most efficient operation, employ an air velocity of less than 3500 feet per minute, but more than 1300 feet per minute. A velocity of 1500 feet per minute in the first cleaning operation in our cleaner has been found satisfactory. This is accomplished by having the cross-sectional area of duct 16 of such size as to handle air volumes of approximately 5000 cubic feet per minute, at a velocity of 1500 feet per minute, through the first cleaning operation only, which is also the approximate volume and velocity of the air and cotton passing through the drier.

The trash contaminated seed cotton leaving the drier 31 through outlet 30 in a relatively thin layer and in a dry and fluffy condition, is introduced into our cleaner through inlet 15, from where it is conveyed through duct 16 by the relatively low air velocity toward a point where lower wall 20 of duct 16 terminates at wall 21 which extends downwardly to form one wall of air-tight trash chamber 22.

The trashy cotton being conveyed along lower wall 20 continues in a horizontal direction and after leaving the wall, crosses trash discharge opening 19 without loss, comes in contact with inclined adjustable partition 17, and is deflected upward. Since the partition is pivoted along its upper edge adjacent to wall 36, it not only provides an adjustment for trash discharge opening 19, but may be used to completely close the opening to effect an efficient by-pass of that portion of the cleaning operation, if desired.

As indicated above, the inclined partition causes the flow of cotton to be changed to an upwardly direction, causing the cotton to enter the vertical portion of duct 16, while the green bolls, rocks and tramp metal fall out of the stream because of the different velocities required for floating seed cotton and the heavier trashes. After falling out of the stream of cotton, the heavier trash rolls or slides down inclined partition 17 and passes through trash discharge opening 19 into air-tight chamber 22, from which it is removed by a conventional vacuum feeder 23 or other suitable means.

Immediately above the pivoted edge of inclined partition 17 horizontal duct 16 becomes vertical for approximately 6 inches, after which its cross-sectional area is reduced to approximately one-third its original area, thus forming a relatively wide, shallow S-shaped duct 32. The velocity of the cotton and light trash is thereby increased to approximately 4500 feet per minute without changing the original volume of 5000 cubic feet per minute. The duct 32 with integral triangular bars 33 and 45 and trash discharge openings 24 and 25 in the outer wall of each reverse turn comprises the second and third cleaning zones in our cleaner. Duct 32 is substantially the same width as duct 16 in the first cleaning zone.

Figure 2:
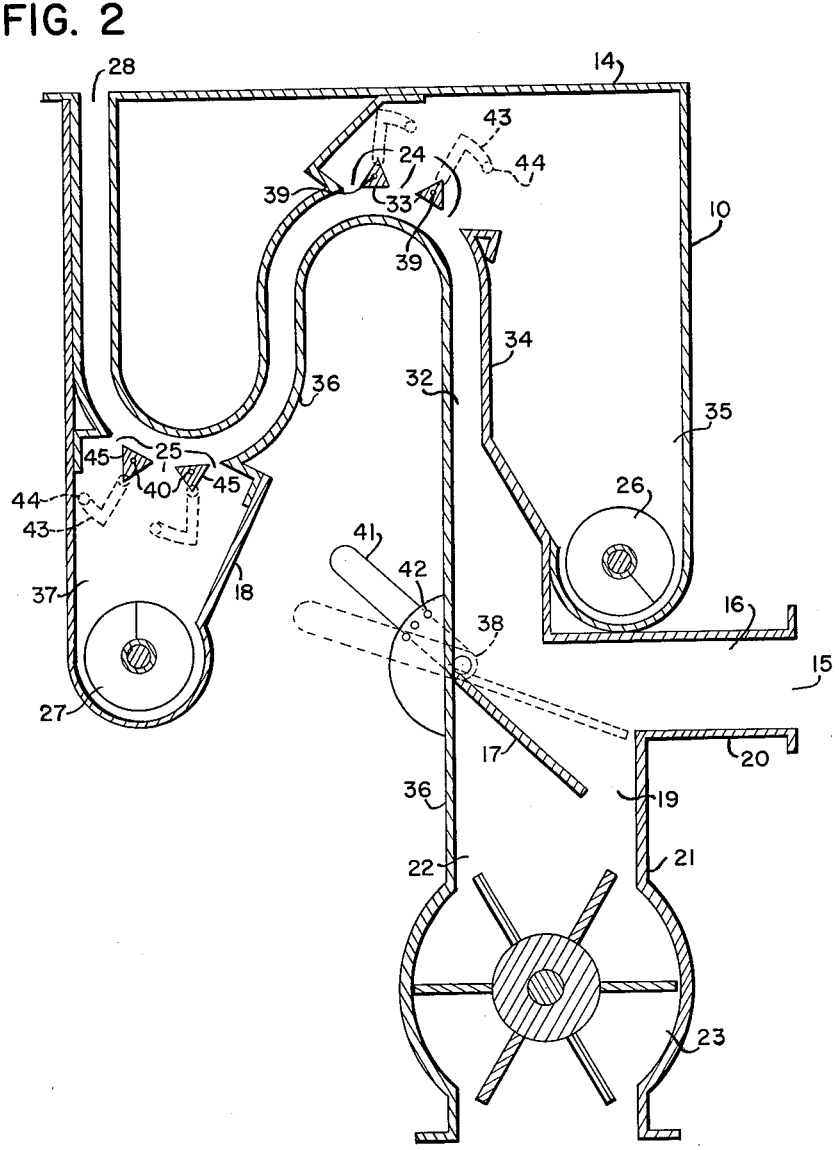
FIGURE 2 is a central section of the cleaner.
Figure 4:
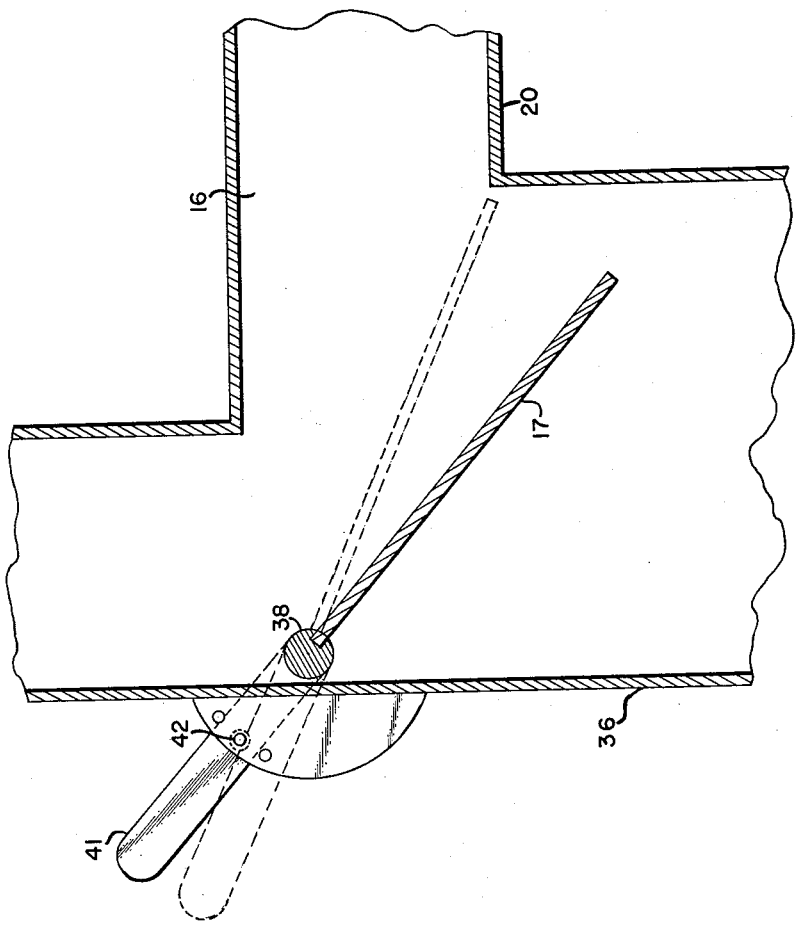
FIGURE 4 is a detail sectional view of the adjustable inclined partition and trash opening taken along line 4—4 of FIGURE 3.
Figure 3:
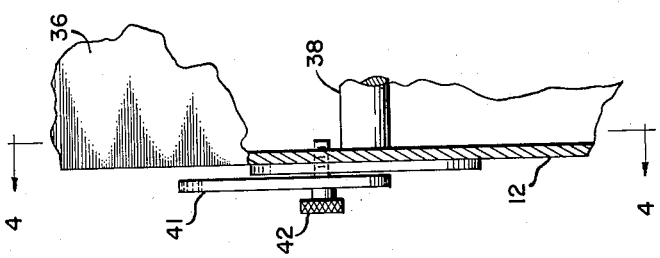
FIGURE 3 is an enlarged fragmental side view of operating handle and locking mechanism for the adjustable inclined partition.
Figure 6:
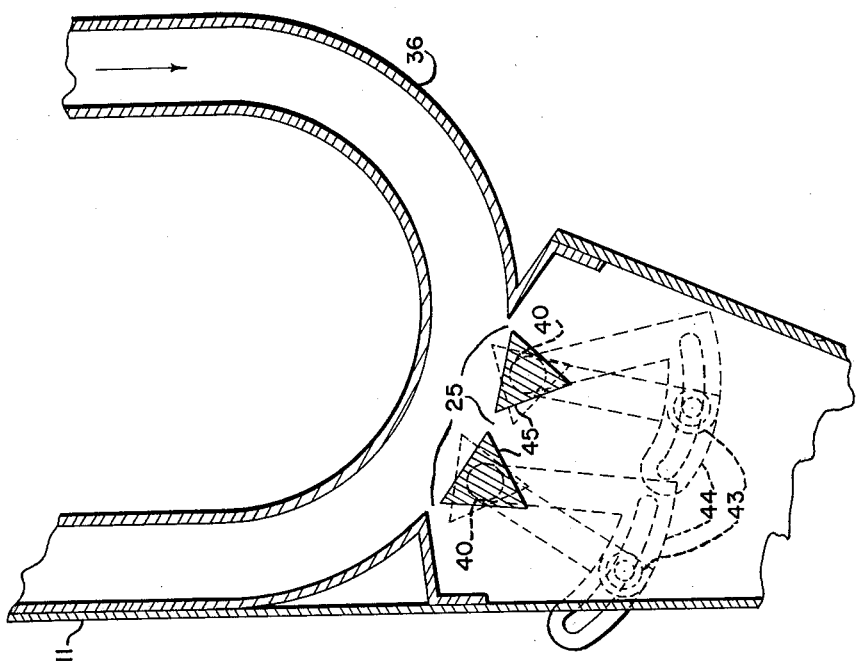
FIGURE 6 is a detail sectional view of the rotatable triangular bars and trash openings taken along line 6—6 of FIGURE 5.
Figure 5:
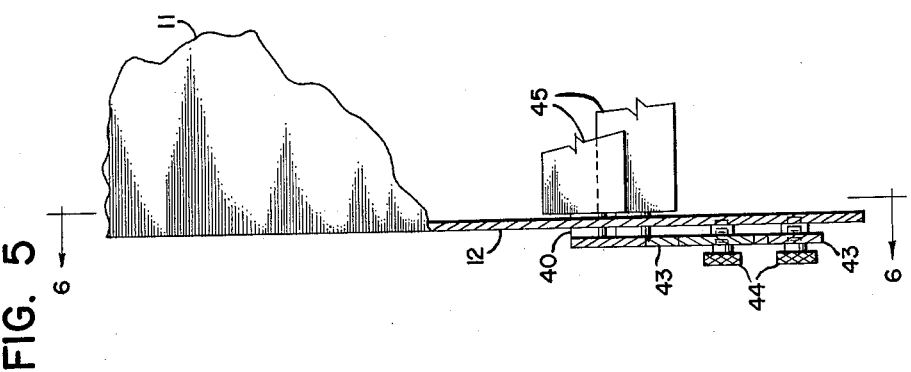
FIGURE 5 is an enlarged fragmental side view of the operating handles and locking mechanism for the rotatable triangular bars.

As already stated, the wide, shallow duct 32 is so constructed as to produce a greatly reduced area compared with the area of duct 16, thereby increasing the velocity of the seed cotton and lighter weight trash, without introducing additional air. In this manner the intensity of the scrubbing action on the cotton across the trash discharge openings 24 and 25 is increased, providing increased trash removal from the cotton without harmful effect to the latter. The trash discharge openings 24 and 25 are substantially the width of duct 32. Triangular shaped bars 33 and 45 are spaced relatively close together and are pivotally mounted on each end by shafts 39 and 40, respectively, extending through walls 12 and 13, respectively. As shown in FIGURES 2, 5, and 6, shafts 39 and 40 are provided with handle 43 outside wall 12 for making adjustment of bars, and with locking screws 44 for securing handle and bars in position after making adjustment. When rotated, one corner of each bar moves into the path of the approaching cotton to provide a scrub-board effect, with the depth of penetration of the corners of the bars into the stream of cotton and the width of the trash openings being progressively and simultaneously increased as the bars are rotated from a neutral position up to 90 degrees. However, we find that rotating the bars up to not more than 25 degrees from a neutral position is sufficient for good cleaning results. Penetration by the bars into the stream of cotton, up to 25 degrees from a neutral position, plus the increased velocity of the trash contaminated cotton enhances the scrubbing action of the cotton across the bars, to afford maximum trash removal with no loss or harmful effects to the cotton.

Since materials heavier than air that move at high velocities tend to hug the outer curved portion of wall 34, this being the first reverse turn of duct 32, the trash contained in the cotton is concentrated in a relatively thin layer along wall 34 and is diverted by the relatively closely spaced triangular bars 33 through slots or trash discharge openings 24 in curved portion of wall 34. Thus, by a scrubbing action, the smaller and lighter weight trashes such as hulls, leaves, sticks and stems, and grass are removed from one side of the stream of seed cotton. The trash thus scrubbed out passes through trash discharge opening 24 and into air-tight chamber 35 which is within the casing and between walls 10 and 34, where it drops by gravity into a conventional screw conveyor 26 or other suitable means, for removal from the chamber. The seed cotton, being larger than the trash will continue across trash discharge openings 24 toward the next cleaning zone.

After the trash containing cotton has been subjected to this cleaning action which removes the trash from one side of the thin layer of cotton, said cotton continues through duct 32 to the reverse turn in the opposite direction, thereby, presenting the opposite side of the thin layer of cotton to triangular bars 45 in opposite wall 36. The opposite side of the thin layer of cotton is scrubbed across triangular bars 45 and trash discharge openings 25, with the trash passing through said openings. The remaining trash thus passes through openings 25 and drops by gravity into a conventional screw conveyor 27 or other suitable means within air-tight chamber 37, which is within the casing and between walls 11 and 18, to be carried away for discard, while the layer of cotton, now having been cleaned on both sides, is pneumatically conveyed to further cleaning equipment if necessary, or directly to the ginning machinery for processing.

While only three cleaning operations are shown in our invention, it will be obvious to those skilled in the art, that various changes and modifications may be made without departing from the spirit thereof.

We claim:

1. A seed cotton cleaner comprising:
   (a) a relatively deep first rectangular duct for conveying a stream of air carrying seed cotton mixed with trash of varying weight at a velocity sufficient to float said seed cotton but insufficient to float said trash;
   (b) a casing surrounding a forward portion of said first duct;
   (c) an adjustable baffle within said first duct extending across the width thereof for deflecting the stream and removing from said stream a portion of the relatively heavier trash carried thereby;

(d) a relatively wide, shallow second duct in said casing connected to said first duct, said second duct being of smaller cross section than said first duct to effect an increase in air velocity, said second duct having two substantially reverse and opposed turns to form a generally S-shaped curve and being provided with a cut-away portion in the outer wall of each of said turns, said cut-away portions extending the entire width of the walls;

(e) a plurality of rotatable, adjustable triangular bars in each of said openings, for removing relatively lighter trash, extending the entire width of the second duct to provide a plurality of parallel passageways through the outer walls of the curved portions of said second duct, said triangular bars being so disposed that an apex portion of each bar extends into the second duct in a direction opposed to the direction of air flow in said second duct; and (f) means connected to said first and second ducts for collecting trash removed by said baffle and triangular bars.

2. A method for cleaning seed cotton containing trash of varying weight comprising:

(a) introducing seed cotton containing trash of varying weight in a stream of air moving at a velocity sufficient to float the seed cotton but insufficient to float the trash;

(b) conveying said stream to a first cleaning zone;

(c) changing the direction of flow of the stream whereby seed cotton and relatively lighter trash continue to flow with said air stream while relatively heavier trash drops out therefrom;

(d) increasing the velocity of flow of the stream along a curved path of flow without increasing the volume thereof to cause stratification of remaining trash along the outer edges of said stream;

(e) scrubbing said outer edges of the stream in second and third cleaning zones to remove trash therefrom while leaving seed cotton suspended in the stream; and (f) conveying cleaned seed cotton from said second and third cleaning zones for further processing.

3. The method of claim 2 wherein the velocity of the stream through the first cleaning zone is about 1500 feet per minute and the velocity through the second and third cleaning zones is about 4500 feet per minute at a constant volume of about 5000 cubic feet per minute.

References Cited in the file of this patent

UNITED STATES PATENTS

| | | |
|---|---|---|
| 1,056,260 | Cheesman | Mar. 18, 1913 |
| 2,280,902 | Ellison | Apr. 28, 1942 |
| 2,366,705 | Berry | Jan. 9, 1945 |
| 2,836,858 | Szaloki | June 3, 1958 |
| 2,929,112 | Massey et al. | Mar. 22, 1960 |